United States Patent
Arpac et al.

(10) Patent No.: US 11,407,903 B2
(45) Date of Patent: Aug. 9, 2022

(54) ALKALI-RESISTANT COATING FOR LIGHTWEIGHT METALS, IN PARTICULAR ALUMINUM

(71) Applicant: EPG (Engineered nanoProducts Germany) AG, Griesheim (DE)

(72) Inventors: Ertugrul Arpac, Antalya (TR); Heike Schneider, Mandelbachtal (DE); Gunter Hoyer, Cologne (DE); Ralf Kockler, Rehlingen Siersburg (DE); Sandra Arend, Breitenbach (DE)

(73) Assignee: EPG (Engineered nanoProducts Germany) AG, Griesheim (DE)

( * ) Notice: Subject to any disclaimer, the term of this patent is extended or adjusted under 35 U.S.C. 154(b) by 276 days.

(21) Appl. No.: 15/769,795

(22) PCT Filed: Oct. 21, 2016

(86) PCT No.: PCT/EP2016/001745
§ 371 (c)(1),
(2) Date: Apr. 20, 2018

(87) PCT Pub. No.: WO2017/067666
PCT Pub. Date: Apr. 27, 2017

(65) Prior Publication Data
US 2018/0305557 A1    Oct. 25, 2018

(30) Foreign Application Priority Data
Oct. 22, 2015   (EP) .................... 15191132

(51) Int. Cl.
| | | |
|---|---|---|
| *C23C 18/12* | (2006.01) | |
| *C09D 5/08* | (2006.01) | |
| *C25D 11/16* | (2006.01) | |
| *C25D 11/24* | (2006.01) | |
| *B05D 1/02* | (2006.01) | |
| *B05D 3/02* | (2006.01) | |
| *B05D 7/14* | (2006.01) | |
| *C09D 4/06* | (2006.01) | |
| *C09D 5/02* | (2006.01) | |
| *C09D 175/06* | (2006.01) | |
| *C25D 11/08* | (2006.01) | |

(52) U.S. Cl.
CPC ............. *C09D 5/08* (2013.01); *B05D 1/02* (2013.01); *B05D 3/0254* (2013.01); *B05D 7/14* (2013.01); *C09D 4/06* (2013.01); *C09D 5/02* (2013.01); *C09D 175/06* (2013.01); *C23C 18/122* (2013.01); *C23C 18/1216* (2013.01); *C23C 18/1241* (2013.01); *C23C 18/1254* (2013.01); *C25D 11/16* (2013.01); *C25D 11/246* (2013.01); *C25D 11/08* (2013.01)

(58) Field of Classification Search
CPC .......... B05D 1/02; B05D 3/0254; B05D 7/14; C09D 5/08; C23C 18/1241; C23C 18/1254
See application file for complete search history.

(56) References Cited

U.S. PATENT DOCUMENTS

| | | | | |
|---|---|---|---|---|
| 6,228,921 B1* | 5/2001 | Kasemann | ............ | C03C 17/008 524/391 |
| 2008/0008838 A1* | 1/2008 | Arpac | ..................... | C08L 75/04 427/386 |
| 2011/0179628 A1* | 7/2011 | Kreye | ..................... | B60R 13/04 29/450 |
| 2015/0315390 A1* | 11/2015 | Endres | ................ | C23C 18/1225 428/323 |

FOREIGN PATENT DOCUMENTS

| | | | | |
|---|---|---|---|---|
| DE | 4338361 | | 5/1995 | |
| DE | 102007003761 | | 8/2008 | |
| DE | 102008063160 | | 7/2010 | |
| DE | 102012022731 | | 5/2014 | |
| DE | 102012022731 A1 * | 5/2014 | ............... | B05D 5/08 |
| DE | 102013017217 | | 4/2015 | |
| DE | 102013017217 A1 * | 4/2015 | ............... | C08K 5/05 |

OTHER PUBLICATIONS

Machine translation of DE 10-2007003761, retrieved Jan. 17, 2020.*
English translation of DE102013017217A1 (Year: 2022).*
International Search Report for PCT/EP2016/001745 dated Dec. 1, 2016, 3 pages.

* cited by examiner

*Primary Examiner* — Hai Y Zhang
(74) *Attorney, Agent, or Firm* — Dority & Manning, P.A.

(57) ABSTRACT

A process for producing a coated lightweight metal substrate, in particular, an aluminium substrate, by a wet-chemical application of a coating composition to the lightweight metal substrate and thermally curing the coating composition is provided. A coating material composition is also described that is formed from a sol-gel material.

15 Claims, No Drawings

ALKALI-RESISTANT COATING FOR LIGHTWEIGHT METALS, IN PARTICULAR ALUMINUM

CROSS REFERENCE TO RELATED APPLICATIONS

This application is the U.S. National Stage entry of International Application Number PCT/EP2016/001745 filed under the Patent Cooperation Treaty having a filing date of Oct. 21, 2016, which claims priority to European Patent Application Number 15191132.8 having a filing date of Oct. 22, 2015, which are incorporated herein by reference.

BACKGROUND OF THE INVENTION

The invention relates to a lightweight metal substrate, in particular made of plain or anodized aluminium, which has been coated with a sol-gel hybrid material, a process for the production thereof and also coating compositions which are used in the process.

Components made of lightweight metals such as aluminium are being used ever more frequently in the exterior and interior of motor vehicles. The exterior components in particular, e.g. decorative strips and running boards, require a coating which protects the components against corrosion and attack by aggressive media such as cleaners. Untreated aluminium surfaces are sensitive to the use of cleaning solutions having pH values of from 1 up to 13.5, as are used to an ever increasing extent in contact-free washing facilities. The components are optically degraded thereby and can lead to customer complaints and claims.

To protect and mechanically stabilize aluminium surfaces, these are treated by the electrochemical process of anodic oxidation, with the oxide layer which naturally forms on the aluminium metal being artificially reinforced (anodization). Depending on the production conditions and aluminium alloys, various types of anodized aluminium layers are known. Industrial anodized aluminium layers are produced at room temperature and current densities of 1.5 $A/dm^2$ in a sulphuric acid electrolyte. Anodized surfaces are transparent and, compared to untreated surfaces, protect the aluminium to a certain degree against corrosion and scratching. Hard anodized aluminium layers are produced at temperatures of about 0° C. at higher current densities of 2-5 $A/dm^2$ in mixed sulphuric acid electrolytes. Compared to industrial anodized aluminium, they display a particularly increased abrasion resistance and scratch resistance. A third process is the bright anodization process. In this process, the metal is brightened by electropolishing before the industrial anodization and is subsequently anodized in a sulphuric acid electrolyte. Anodized aluminium layers have a porous structure and dyes or other substances can optionally be introduced into these pores. The openings of the pores can be closed by sealing in hot water. Here, aluminium oxide hydrate (boehmite) is formed in the pore, leading to an improvement in the corrosion resistance. The alkali resistance, on the other hand, cannot be improved in this way.

Although anodization improves the corrosion resistance compared to plain aluminium, the anodized aluminium layers have the disadvantage of a lack of pH stability. The layers are stable only in the pH range from 4 to 9. In the case of pH values outside this range, it is known that either the plain aluminium or the anodized aluminium layer has to be protected by means of a superposed layer. This is the case particularly in all applications in which the Al components come into contact with aggressive acidic or basic media, for example in the case of visible exterior parts in automobiles, e.g. decorative strips and running boards, which are cleaned in alkaline washing facilities.

For economic reasons, it is desirable to use as few as possible process steps in order to achieve the required resistance. For this reason, there is a great need for a wet-chemical process which circumvents the energy-intensive anodization process and at the same time provides the properties of alkali resistance, corrosion resistance and abrasion resistance.

Various ways of optimizing the corrosion resistance, in particular the acid and alkali resistance of decorative and functional parts, on automobiles are known from the prior art. Here, two approaches have crystallized. The first approach is based on surface coating with a transparent coating on the anodic coating in order to maintain the optical appearance. In the second approach, an attempt is made to strengthen the porous anodized aluminium layer by varying the sealing process.

EP 1 407 935 A1 describes a process in which partially densified bright anodized aluminium surfaces are coated with a thin transparent ceramic coating (Cerapaint, Aluceram). The coating is applied electrostatically, and the layer thickness is in the range from 5 to 7 µm. The surfaces provided with the thin ceramic coating have good corrosion properties but are stable only in the pH range from 1 to 13.5.

The patent document DE 10 2012 019 969 A1 discloses a process in which the anodized aluminium layer is produced in an anodizing process in such a way that a continuously increased voltage from 0 V up to a hold voltage is applied and a constant voltage gradient is used. The pore structure formed here has a high pore density, which is highly suitable for bringing about bonding of a subsequently applied sol-gel solution.

DE 2006 011 769 B4 indicates a process in which partially or fully densified bright-anodized decorative or functional parts are treated by means of a wet chemical process in such a way that these parts are joined to a layer of ambivalent molecules in such a way that the functional end is joined to the anodized layer and the further functional end projects hydrophobically out of the layer.

WO2009/068168A1 describes a process which, proceeding from an anodized layer on aluminium, covers this layer by a uniform covering layer. The covering layer is produced by closing the pores by means of an aluminium oxide hydrate layer and additionally incorporating aluminium silicates therein or building up aluminium silicates thereon.

A process for coating optical shaped bodies is described in DE 102013017217.

Although good results have already been achieved using the known systems, there is still great scope for improvements, for example as concerns the alkali resistance or protection of unanodized substrates with transparent coatings.

SUMMARY

It is therefore an object of the invention to discover a process for coating anodized aluminium, in particular bright-anodized aluminium, on aluminium substrates, which displays a particularly high alkali stability in the pH range from 1 to 14.

It was a further object of the invention to discover a process for the simple replacement of an anodically oxidized surface of aluminium or an aluminium alloy, i.e. a process which dispenses with the costly anodization process.

The object has surprisingly been able to be achieved by coating lightweight metal substrates, in particular anodized or unanodized aluminium surfaces, with a coating composition which consists of a sol-gel hybrid structure, starting out from particular components.

The invention accordingly provides a process for producing a coated lightweight metal, in particular aluminium, substrate, which comprises the steps
a) wet-chemical application of a coating composition to the lightweight metal substrate and
b) thermal curing of the coating composition,
wherein the coating composition contains a sol-gel material obtained from
A. one or more partially hydrolysed alkoxysilanes of the formula (I),

where the symbols and indices have the following meanings:
$R^1$ is $C_1$-$C_6$-alkyl or $C_1$-$C_{10}$-aryl,
$R^2$ is $C_1$-$C_4$-alkyl, $C_2$-$C_4$-alkenyl or $C_2$-$C_4$-alkynyl, $C_6$-$C_{10}$-aryl, $C_6$-$C_{10}$-aralkyl or $C_6$-$C_{10}$-alkaryl,
$R^3$ is an epoxy-functional group and
n is 1, 2 or 3;
B. one or more metal alkoxides of the formula (II)

where the symbols and indices have the following meanings:
M is a metal of main or transition group 3 or 4 having an EN<1.5, preferably Al, Zr, Ti or B, particularly preferably Al;
X is ($OR^4$), halogen, $NH_3$ or a primary, secondary or tertiary ($C_1$-$C_4$)-alkylamine,
$R^4$ is $C_1$-$C_6$-alkyl or $C_6$-$C_{10}$-aryl and
m is 0 or 1, preferably 1,
in combination with one or more complexing agents from the group consisting of 1,3-dicarbonyl compounds;
C. an oligomeric or polymeric polyol and
D. optionally one or more blocked polyisocyanates.

The invention further provides a lightweight metal substrate, in particular aluminium substrate, coated using the process of the invention.

The invention further provides a lightweight metal substrate, in particular aluminium substrate, coated with the coating composition of the invention.

The invention likewise provides for the use of a coating composition according to the invention for coating lightweight metal substrates, in particular aluminium substrates.

The invention further provides a coating composition containing a sol-gel material obtained from
A. partially hydrolysed 3-glycidyloxypropyltrimethoxysilane,
B. aluminium sec-butoxide complexed with ethyl acetoacetate,
C. a branched, hydroxyl-containing polyester and
D. optionally one or more, preferably aliphatic, blocked polyisocyanates.

DETAILED DESCRIPTION

The coating produced according to the invention displays an advantageous combination of alkali resistance, corrosion resistance and abrasion resistance.

It has now surprisingly been found that the system is stable to alkali up to pH 14 (according to the acid-heat-alkali alternation test in accordance with VW standard TL182) and significantly improved abrasion and scratch resistance compared to the surfaces described in the prior art. For example, there is no visible damage even after 1000 strokes in the Crockmeter test. It has additionally been found that a significant improvement in the corrosion resistance (CASS test) can be achieved both on anodized but in particular on unanodized Al components by means of further modification of the abovementioned system with isocyanates.

The invention therefore makes it possible to avoid or replace the costly anodization process.

The advantages achieved by means of the invention are thus in the following areas:
simple coating process without complicated or repeated sealing processes;
significantly improved chemical and mechanical stabilities without impairment of the optical appearance, in particular in the case of bright-anodized components;
inexpensive process which does not change the surface impression of aluminium and
the surface structure (polished, ground, matted) is reproduced.

Without being tied to this theory, the property improvements found can be explained by, firstly, the fact that ring-opening of the silane, which allows organic crosslinking with the added polyol, occurs due to the use of the complexed metal alkoxide. Secondly, there is formation of SiOAl bonds by means of which the inorganic part of the network is modified. A hybrid network which has improved alkali resistance and, due to the high densification, offers very good corrosion protection is formed. The known alkali instability of pure $SiO_2$-based systems can be improved thereby. The further addition of a polyisocyanate or diisocyanate effects additional urethane-like crosslinking which contributes to a further improvement in the protective action.

For the purposes of the invention, lightweight metals are metals and alloys having a density below 5 g/cm$^3$. Preference is given to Al, Mg and Ti and alloys thereof, with particular preference being given to Al and its alloys, in particular with the elements Mn, Mg, Cu, Si, Ni, Zn and Be. The designation of aluminium alloys follows EN 573-3/4.

The terms "anodically oxidized" and "anodized" are used synonymously in the context of the invention.

In a preferred embodiment, the substrate is an unanodized aluminium substrate.

In a further embodiment, the substrate is an anodized aluminium substrate.

Component A

In the formula (I) of the partially hydrolysed alkoxysilane, the symbols and indices preferably have the following meanings:
$R^1$ is preferably methyl, ethyl, propyl or butyl, where the latter two groups are unbranched or branched, preferably unbranched, particularly preferably methyl or ethyl.
n is preferably 2 or 3, preferably 3.
$R^2$ is preferably $C_1$-$C_4$-alkyl, in particular methyl or ethyl.
$R^3$ is preferably an epoxyalkyl group whose alkyl group can be interrupted by one or more heteroatoms such as oxygen or nitrogen. The alkyl group can additionally be substituted by one or more substituents such as hydroxy, amino, carboxy or aryl. The alkyl group can be linear, branched and/or cyclic. Preferred alkyl groups contain from 1 to 20, in particular from 1 to 10, carbon atoms outside the oxirane ring. The alkyl group is particularly preferably interrupted by an oxygen atom. A particularly preferred epoxy-functional group is the glycidyloxypropyl group.

Suitable epoxy-modified alkoxysilanes are, for example, 3-glycidyloxypropyltrimethoxysilane, 3-glycidyloxypropyltriethoxysilane, 3,4-epoxybutyltrimethoxysilane, 3,4-epoxybutyltriethoxysilane, 2-(3,4-epoxycyclohexyl)ethyltrimethoxysilane, 2-(3,4-epoxycyclohexyl) ethyltriethoxysilane, 3-glycidyloxypropyldimethylethoxysilane, 3-glycidyloxypropyldimethylmethoxysilane, 3-glycidyloxypropylmethyldiethoxysilane and 3-glycidyloxypropylmethyldimethoxysilane.

The epoxy-functionalized group is not hydrolysable.

Suitable molar ratios for the partial hydrolysis:silane of the general formula (I) to water are generally 7.5:1-1:1.5, preferably 5:1-1:1, with the ratio 1:1 being particularly preferred.

Component B

Suitable metals are metals having an electronegativity of <1.5 (Pauling units) from main and transition groups 3 and 4 of the Periodic Table of the chemical Elements, preferably Al, Ti, Zr and B. Particular preference is given to Al.

In the general formula (II), n is 0 or 1, preferably 1. X is preferably an $OR^4$ group. $OR^4$ is preferably $C_{1-6}$-alkoxy, $C_{6-10}$-aryloxy or H. Preferred $OR^4$ groups are methoxy, ethoxy, propoxy and butoxy. Particular preference is given to ethoxy and sec-butoxy. Aluminium alkoxides, in particular aluminium tri-sec-butoxide (aluminium tri-sec-butylate, aluminium tri-sec-butanolate), are particularly preferred.

Metal alkoxides, for example aluminium sec-butoxide, which have a measurable reduction in the hydrolysis and condensation rate as a result of suitable complexation react with alkoxysilanes of the general formula (I) by a prehydrolysis carried out using a significantly substoichiometric amount of water, based on the complete hydrolysis of the (RO) groups, to give homogeneous, transparent, still liquid condensates which after addition of a polyol (component C) form layers having an extraordinarily high hydrolytic stability.

Suitable complexing agents are 1,3-dicarbonyl compounds, e.g. β-diketones and β-keto esters. Examples are ethyl acetoacetate, allyl acetoacetate, methacryloxyethyl acetoacetate, 3-acetyl-6-trimethoxysilylhexan-2-one, 2,2,6,6-tetramethyl-3,5-heptanedione, methylbutyloyl acetate, ethylbenzoyl acetate. Preferred complexing agents are β-diketones and β-keto esters, with particular preference being given to acetylacetone (pentane-2,4-dione) and ethyl acetoacetate (acetoacetic ester, ethyl 3-oxobutyrate), in particular ethyl acetoacetate.

Molar ratios of metal alkoxide to complexing agent of 0.9:1.1 have been found to be suitable and 1:1 has been found to be particularly suitable.

Component C

Suitable components C are oligomeric or polymeric polyols such as polyvinyl alcohols (obtainable, for example, under the Mowiol® trade names) or polyesters having OH groups.

As component C, preference is given to using polyester polyols, polyether polyols, polyether ester polyols, polycarbonate polyols, polyether carbonate polyols, polybutadiene derivatives, polysiloxane-based derivatives and mixtures thereof, as are known from the production of polyurethanes.

Suitable polyester polyols can be polycondensates of diols and optionally triols and tetraols and dicarboxylic and optionally tricarboxylic and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols for preparing the polyesters.

Polyester polyols are prepared in a manner known per se by polycondensation from aliphatic and/or aromatic polycarboxylic acids having from 4 to 16 carbon atoms, optionally from their anhydrides and optionally from their low molecular weight esters, including cyclic esters, using predominantly low molecular weight polyols having from 2 to 12 carbon atoms as reaction component. Examples of suitable alcohols are ethylene glycol, butylene glycol, diethylene glycol, triethylene glycol, polyalkylene glycols such as polyethylene glycol, also 1,2-propanediol, 1,3-propanediol, 1,3-butanediol, 1,4-butanediol, 1,6-hexanediol and isomers, neopentyl glycol or neopentyl glycol hydroxypivalate or mixtures thereof, with 1,6-hexanediol and isomers, 1,4-butanediol, neopentyl glycol and neopentyl glycol hydroxypivalate being preferred. In addition, polyols such as trimethylolpropane, glycerol, erythritol, pentaerythritol, trimethylolbenzene or trihydroxy ethyl isocyanurate or mixtures thereof can also be used. Particular preference is given to using diols, very particularly preferably 1,4-butanediol and 1,6-hexanediol, very particularly preferably 1,6-hexanediol.

As dicarboxylic acids, it is possible to use, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. The corresponding anhydrides can also be used as acid source.

In addition, monocarboxylic acids such as benzoic acid and hexanecarboxylic acid can be concomitantly used.

Suitable compounds are, for example, marketed by Covestro under the Desmophen® trademarks. Particular preference is given to Desmophen D651 MDA/X, a branched polyester polyol from Covestro.

Component D

Suitable components D are, according to the invention, blocked polyisocyanates based on, for example, butylene 1,4-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes (H12-MDI) or their mixtures having any isomer content, cyclohexylene 1,4-diisocyanate, 4-isocyanatomethyloctane 1,8-diisocyanate (nonane triisocyanate), phenylene 1,4-diisocyanate, tolylene 2,4- and/or 2,6-diisocyanate (TDI), naphthylene 1,5-diisocyanate, diphenylmethane 2,2'- and/or 2,4' and/or 4,4'-diisocyanate (MDI), 1,3- and/or 1,4-bis(2-isocyanatoprop-2-yl)benzene (TMXDI), 1,3-bis-(isocyanatomethyl)benzene (XDI), alkyl 2,6-diisocyanatohexanoates (lysine diisocyanates) having alkyl groups having from 1 to 8 carbon atoms and also mixtures thereof. Furthermore, modifications such as compounds which are based on the abovementioned diisocyanates and contain allophanate, uretdione, urethane, isocyanurate, biuret, iminooxadiazinedione or oxadiazinetrione structures are suitable building blocks for the component D, as are polycyclic compounds such as polymeric MDI (pMDI), and also combinations of all these.

Particular preference is given to using blocked diisocyanates based on HDI and IPDI.

The isocyanate groups are partially or entirely present in blocked form, so that they cannot react directly with an isocyanate-reactive group. This ensures that the reaction takes place only at a particular temperature (blocking temperature). Typical blocking agents may be found in the prior art and are selected so that they split off again from the isocyanate group at temperatures in the range from 60 to 220° C., depending on the substance, and only then react with the isocyanate-reactive group. Typical blocking agents are, for example, caprolactam, methyl ethyl ketoxime, pyrazoles such as 3,5-dimethyl-2-pyrazole or 1-pyrazole, triazoles such as 1,2,4-triazole, diisopropylamine, diethyl malonate, diethylamine, phenol or derivatives thereof or imidazole.

Such blocked isocyanates are commercially available, for example under the Desmodur® trademarks from Covestro. Particular preference is given to blocked polyisocyanates based on isophorone diisocyanate and hexamethylene diisocyanate, as are obtainable under the designation Desmodur® PL 340 and 350 from Covestro.

The production of the coating composition is advantageously carried out in a plurality of stages. The partial hydrolysate (starting component A) is firstly mixing the alkoxysilane (I) with water in a molar ratio of 7.5:1-1:1.5, preferably in a ratio of 5:1-1:1 and particularly preferably in a ratio of 1:1, and stirring the mixture intensively at room temperature. Periods of time of from 8 to 16 hours, particularly preferably 12 hours, have been found to be suitable.

The preparation of the metal alkoxide complex (starting component B) is carried out at low temperatures in the range from −10° C. to 0° C., with particular preference being given to temperatures of 0° C. in an ice bath. The complexing agent is added to the initially charged metal alkoxide with exclusion of air. The mixture is subsequently stirred, preferably for from 8 to 48 hours, with 24 hours being particularly preferred.

The production of the base solution by reaction of the starting components A and B is generally carried out by mixing starting component A with starting component B at temperatures of preferably from −10° C. to 0° C., with an ice bath and 0° C. being particularly preferred.

Mixing is effected by addition of the metal complex solution while stirring to the prehydrolysate of the alkoxysilane (I) in a molar ratio of 0.1:1-1:1, preferably 0.2:1-0.5:1, in particular 0.3:1-0.4:1.

Stirring is carried out at temperatures in the range from 0° C. to 50° C., preferably from 10 to 30° C., particularly preferably 25° C. The duration of stirring and thus the duration of homogeneous mixing is in the range from 1 to 60 minutes, preferably from 5 to 45 minutes, particularly preferably 30 minutes.

An oligomeric or polymeric polyol, for example a polyvinyl alcohol or polyester alcohol, is added as component C to the resulting mixture of the components A and B.

The molar ratio of alkoxysilane (I) to polyol is generally 2:1-1:2.

To complete the reaction, from 3 to 100 ml, preferably from 3 to 50 ml and particularly preferably from 4 to 4.5 ml, distilled water are added dropwise per 50 ml of reaction solution and the mixture is stirred for a further 1 to 5 hours, preferably 2 hours (base solution).

Polyisocyanates can optionally be added as component D to the mixture described.

In a preferred embodiment, the coating composition contains blocked isocyanates as component D. This is typically added while stirring to the solution of the components A, B and C.

The ratio of free hydroxy groups in the polyol to NCO groups is generally from 5:1 to 1:1, preferably from 2.5:1 to 1:1, in particular from 1.2:1 to 1:1.

To complete the reaction, the mixture is stirred for a further period of time, typically from 1 to 3 hours.

In a further embodiment, the coating composition does not contain any blocked isocyanates as component D.

To produce coating solutions, commercial solvents as are described, for example, in technical handbooks for surface coatings are added to the base solution so as to set the appropriate viscosity. Examples of such solvents are aliphatic alcohols, aliphatic esters, alcohols containing alkoxy groups, for example 1-methoxy-2-propanol, ketones, including substituted ketones, for example butyl acetate, or xylene or mixtures of these.

The amounts added per 50 ml of coating composition are in the range from 5 to 200 ml, preferably from 10 to 100 ml and particularly preferably from 10 to 20 ml.

In addition, commercial additives to modify the rheology, in particular wetting agents and levelling agents as are marketed, for example, by the company Byk in a very wide variety of embodiments can be added to the base solution.

In one embodiment, pigments (organic and inorganic, coloured inorganic ions or coloured complexes, effect pigments) or soluble dyes are added as colorants to the base solution in addition to the abovementioned additives in order to achieve various colour effects. Representatives of the many pigments available on the market are, for example, from the palette of BASF SE, effect pigments Black Olive™, effect pigments based on mica, Dynacolor® pearlescent pigments, Firemist® pigments based on borosilicate, Glacier™ Frost White, Graphitan® graphite black pigment, Lumina® effect pigments based on mica, Lumina® Royal effect pigments based on mica, MagnaPearl® pearlescent pigments, Mearlin® pearlescent pigments, Mearlite® gloss pigments, Metasheen® vacuum-metalized aluminium pigments, Paliocrom® effect pigments, Paliocrom® Brilliant effect pigments, Santa Fe™ colour effect pigments or others, for example Timrex KS4, Aerosil 200 and Iriodin 299 or from Timrex KS4, Aerosil 200 and Iriodin 532. Metal complex dyes are, for example, anionic chromium and cobalt complexes of azo dyes. The cation is, for example, either a sodium ion or a substituted ammonium ion. Substituted soluble phthalocyanines likewise belong to this category.

Examples of organic azo pigments are: monoazo yellow and orange, naphthol, naphthol AS, azo colour coatings, benzimidazolone, metal-organic complexes.

Examples of organic polycyclic pigments are: phthalocyanine, quinacridone, perylene and perinone, thioindigo, anthraquinone, dioxazine, isoindolinone and isoindoline, diketopyrrolopyrrol (DPP), triarylcarbonium, quinophthalone. Examples of inorganic pigments are:

Iron oxide, chromium oxide green, ultramarine blue, iron blue, phthalochrome green, various mixed metal oxides, bivanadate, manganese oxide (MnO). Possible dyes are, for example, anthraquinone dyes, azo dyes, dioxazine dyes, indigo dyes, nitro and nitroso dyes, phthalocyanine dyes, sulphur dyes, triphenylmethane dye. Specific examples are congo red, methyl orange, rhodamine B or methyl red. The pigments required for 50 ml of coating solution depend on the desired intensity of colour and range from 0.1 to 20 g, preferably from 1 to 15 g, particularly preferably from two to 12 g.

To effect intensive dispersion, the mixtures of base solution and pigment are, for example, dispersed in a ball jet mill at generally from 1000 to 2500 revolutions/minute, preferably at 2000 revolutions/minute. The dispersing time is generally from 5 to 120 minutes, preferably from 10 to 80 minutes and particularly preferably from 50 to 70 minutes.

The wet-chemical application (step a)) of the coating composition can be carried out by means of the customary wet-chemical coating techniques known to those skilled in the art, e.g. spraying, dipping, casting, centrifugation, roller application, painting, doctor blade coating or curtain coating. It is also possible to use, for example, printing processes such as screen printing. Application by spraying is preferred, for example on bright-anodized decorative strips.

The coating composition applied to the substrate is normally cured at temperatures of from 130 to about 200° C., preferably from 170 to 190° C. (step b)), with temperatures up to about 160° C. and curing times of about 1 hour being employed in the case of an anodized surface. Thermal densification can optionally also be carried out by means of IR or NIR radiation.

Curing can be effected by any type of introduction of heat (ambient temperature, infrared radiation, microwave radiation). In the case of conventional introduction of heat, the treatment time is in the range from 20 to 120 minutes, particularly preferably from 50 to 70 minutes. The curing temperatures are in the range from 120 to 220° C., preferably from 140 to 200° C. and particularly preferably from 150 to 190° C.

Microwave curing is carried out using conventional commercial plants and the curing time is in the range from 5 to 20 minutes, particularly preferably from 5 to 15 minutes.

The substrate provided with the hybrid layer can be a semifinished part, e.g. plates, metal sheets, tubes, rods or wires, a component or a finished product. It can, for example, be used for plants, tools, domestic appliances, electric components, machines, vehicle parts, in particular automobile parts, production plants, exterior walls, heat exchangers, clothes irons or parts thereof.

The coatings are particularly suitable for aluminium substrates such as metal housings of electronic appliances, components for optical instruments, parts of vehicles in the interior and exterior region, components in machine and plant construction, engines, components of medical instruments, components of domestic appliances, other electric appliances and turbines, household appliances, exterior wall components, components of lifts, parts of conveying facilities, parts of furniture, garden equipment, agricultural machines, coverings, engine components and production plants in general.

The invention will be illustrated by the following examples, which do not constitute any restriction.

Example 1

0.246 mol of 3-glycidyloxypropyltrimethoxysilane (GLYMO) was placed in a reaction vessel and 0.246 mol of distilled water was added dropwise. The mixture was stirred for 24 hours (solution A).

0.095 mol of ethyl acetoacetate was placed in a round-bottom flask and cooled in an ice bath. 0.095 mol of aluminium sec-butoxide was added dropwise by means of a dropping funnel in such a way that the temperature of the mixture remained below 40° C. The mixture was stirred for 24 hours (solution B).

Solution A and solution B were combined by cooling solution A in an ice bath and adding solution B dropwise. The mixture was subsequently stirred for another 1 hour.

59.7 g of branched polyester having free OH groups (Desmophen® D651 MPA/X) were added to the resulting mixture and the mixture was stirred until the solution became transparent. Finally, 0.692 mol of water and 1.900 mol of ethanol were added to the mixture and the mixture was stirred for another 2 hours.

Example 2

0.246 mol of 3-glycidyloxypropyltrimethoxysilane (GLYMO) was placed in a reaction vessel and 0.246 mol of distilled water was added dropwise. The mixture was stirred for 24 hours (solution A).

0.095 mol of ethyl acetoacetate was placed in a round-bottom flask and cooled in an ice bath. 0.095 mol of aluminium sec-butoxide was added dropwise by means of a dropping funnel in such a way that the temperature of the mixture remained below 40° C. The mixture was stirred for 24 hours (solution B).

Solution A and solution B were combined by cooling solution A in an ice bath and adding solution B dropwise. The mixture was subsequently stirred for another 1 hour. 59.7 g of a branched polyester containing hydroxyl groups (Desmophen® D651 MPA/X) were added to the resulting mixture and the mixture was stirred until the solution became transparent. A mixture of blocked aliphatic polyisocyanates based on isophorone diisocyanate (IPDI) and hexamethylene diisocyanate (9.00 g of Desmodur® PL340 and 20.88 g of Desmodur® PL350) was then added to the mixture and the mixture was stirred further. Finally, 0.278 mol of water and 1.900 mol of ethanol were added to the mixture and the mixture was stirred for another 2 hours.

Spray Coating

To effect spray coating, the above-described coating solution was mixed with 8 g of 1-methoxy-2-propanol and applied by means of a 0.5 mm nozzle to Q panels made of the aluminium alloy AW EN 5005 or to bright-anodized extruded profiles composed of the alloy AW EN 6060.

Curing of the Layer Using Heat

The layer was cured thermally at a temperature of 160° C. for one hour.

The properties of the layers produced according to the invention were tested using the following methods:

Alkali Stability

The alkali stability of the surface was tested at 23° C. by a method having the following sequence (acid-heat-alkali resistance test):

- 10 minutes dipping in pH 1 solution (0.1 N hydrochloric acid)
- rinsing in deionized water and drying
- 1 hour heat treatment at 40° C. (further test sequence without cooling)
- 10 minutes dipping in pH 14 solution (1.0 N sodium hydroxide)
- rinsing in deionized water and drying After the procedure, there were no visible changes compared to the starting state.

Scratch Resistance

The scratch resistance of the surfaces of the coatings was tested by means of a Crockmeter test (method based on EN ISO 105-X12 using 1000 double strokes and an applied force of 9 N and using a sponge (Scotch-Brite™ SCH106).

After the procedure, there were no visible changes compared to the starting state.

Corrosion Resistance

To test the corrosion resistance of the surface coating, the coating was subjected to a salt spray test in accordance with DIN EN ISO 9227. In particular, the CASS test in accordance with DIN EN ISO 9227 CASS was used.

After 48 hours of the CASS test, there were no changes compared to the starting state.

The invention claimed is:

1. A process for producing a coated lightweight metal substrate, which comprises the steps:
   a) wet-chemically applying a coating composition to the lightweight metal substrate and
   b) thermally curing the coating composition,
wherein the coating composition contains a sol-gel material obtained from
   A. one or more partially hydrolysed alkoxysilanes of formula (I), $$(R^1O)_n SiR^2_{3-n} R^3 \qquad (I),$$

where the symbols and indices have the following meanings:
   $R^1$ is $C_1$-$C_6$-alkyl or $C_1$-$C_{10}$-aryl,
   $R^2$ is $C_1$-$C_4$-alkyl, $C_2$-$C_4$-alkenyl or $C_2$-$C_4$-alkynyl, $C_6$-$C_{10}$-aryl, $C_6$-$C_{10}$-aralkyl or $C_6$-$C_{10}$-alkaryl,
   $R^3$ is an epoxy-functional group and
   n is 1, 2 or 3;
   B. one or more metal alkoxides of the formula (II)

$$M^{+(4-m)}(X)_{4-m} \qquad (II),$$

where the symbols and indices have the following meanings:
   M is a metal of main or transition group 3 or 4 having an EN<1.5, preferably Al, Zr, Ti or B;
   X is (OR$^4$), halogen, NH3 or a primary, secondary or tertiary ($C_1$-$C_4$)-alkylamine,
   $R^4$ is $C_1$-$C_6$-alkyl or $C_6$-$C_{10}$-aryl and
   m is 0 or 1,
   in combination with one or more complexing agents from the group consisting of 1,3-dicarbonyl compounds;
   C. one or more oligomeric or polymeric polyols and
   D. one or more blocked polyisocyanates; and wherein the partial hydrolysis of the alkoxysilanes of formula (I) is conducted prior to combination of component (A) with (B), (C), and (D).

2. The process according to claim 1, wherein the symbols and indices in the formula (I) have the following meanings:
   $R^1$ is $C_1$-$C_4$-alkyl;
   $R^3$ is 3-glycidyloxypropyl and
   n is 3.

3. The process according to claim 1, wherein the one or more partially hydrolysed alkoxysilanes of the formula (I) is selected from among 3-glycidyloxypropyltrimethoxysilane and 3-glycidyloxypropyltriethoxysilane.

4. The process according to claim 1, wherein the partial hydrolysis of the one or more partially hydrolysed alkoxysilanes of the formula (I) is brought about by addition of from 0.13 to 1.5 mol of water, based on 1 mol of the compound (I).

5. The process according to claim 1, wherein the symbols and indices in the formula (II) have the following meanings:
   M is Al, Zr, Ti or B;
   X is OR$^4$;
   $R^4$ is $C_1$-$C_6$-alkyl and
   m is 0 or 1.

6. The process according to claim 1, wherein the compound (II) is aluminum tris-sec-butoxide.

7. The process according to claim 1, wherein the complexing agent of the component B is selected from among acetylacetone and ethyl acetoacetate.

8. The process according to claim 1, wherein a branched polyester polyol is used as component C.

9. The process according to claim 1, wherein the component D is present and one or more blocked polyisocyanates based on isophorone diisocyanate or hexamethylene diisocyanate are used as component D.

10. The process according to claim 1, wherein the wet-chemical application in step a) is effected by spraying.

11. The process according to claim 1, wherein the thermal curing in step b) is effected at a temperature in the range from 130 to 200° C.

12. The process according to claim 1, wherein the lightweight metal substrate, is a running board or a decorative strip.

13. The process according to claim 1, wherein the lightweight metal substrate is aluminum.

14. A coating composition containing a sol-gel material obtained from combining:
   A. partially pre-hydrolysed 3-glycidyloxypropyltrimethoxysilane,
   B. aluminum sec-butoxide complexed with ethyl acetoacetate,
   C. a branched, hydroxyl-containing polyester and
   D. one or more blocked polyisocyanates.

15. A lightweight metal substrate coated with a coating composition as described in claim 14.

* * * * *